Patented Apr. 20, 1926.

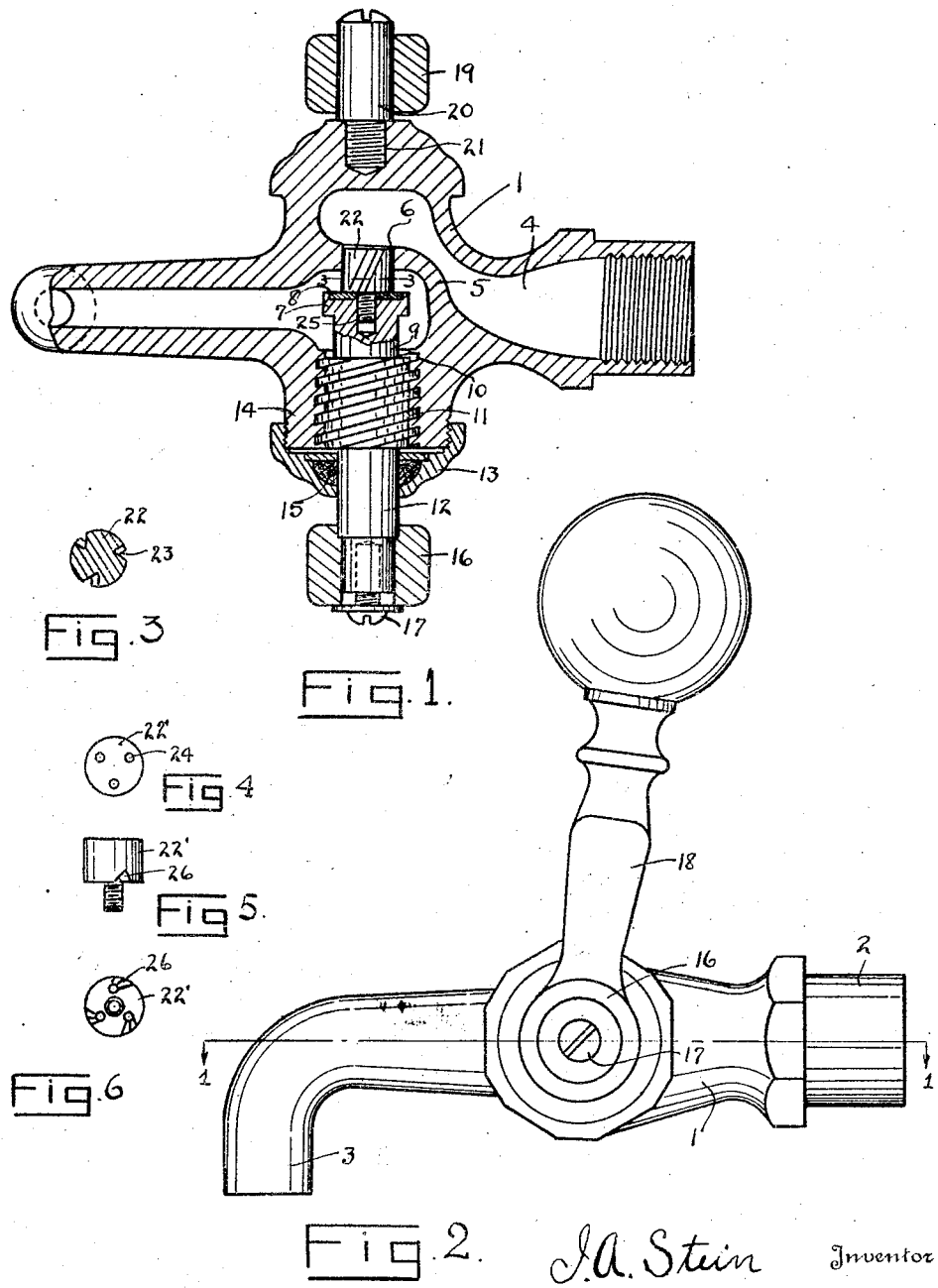
April 20, 1926. 1,581,362
I. A. STEIN
AGITATOR ATTACHMENT FOR VALVES
Filed Nov. 10, 1925

1,581,362

UNITED STATES PATENT OFFICE.

ISAAC A. STEIN, OF GALVESTON, TEXAS.

AGITATOR ATTACHMENT FOR VALVES.

Application filed November 10, 1925. Serial No. 68,053.

*To all whom it may concern:*

Be it known that I, ISAAC A. STEIN, a citizen of the United States, residing at Galveston, Galveston County, Texas, have invented a certain new and useful Improvement in Agitator Attachments for Valves, of which the following is a specification.

My invention relates to dispensing faucets, and more particularly to the construction of the valve employed therein.

In the dispensing of drinks, and more particularly drinks such as root beer, in which the foaming of the liquid is desired, the ordinary dispensing faucet is not adapted to produce a maximum of agitation to the fluid being dispensed.

It is an object of this invention to provide a means connected with the valve of the faucet whereby the liquid being dispensed may be agitated and caused to foam more effectively than in the ordinary faucet. It is desired that the valve be constructed to cause the liquid to pass through a small passage, preferably spirally of the said passage, so that a whirling motion is given to the liquid, causing it to mix with the air, thereby including with said liquid a large number of fine bubbles and giving to the drink a creamy consistency.

In carrying out my invention, I have illustrated the same as being applied to a faucet the same in structure as that shown in my co-pending application No. 62,156, filed October 12th, 1925.

In the drawing, Fig. 1 is a horizontal section on the line 1—1 of Fig. 2. Fig. 2 is a side elevation of a faucet embodying my invention. Fig. 3 is a transverse section on the line 3—3 of Fig. 1. Fig. 4 is an end elevation of one embodiment of the valve extension. Fig. 5 is a side elevation thereof and Fig. 6 is an end elevation taken from the end opposite to that shown in Fig. 4. Like numerals of reference are employed to designate like parts in all the views.

The faucet shown in the drawing comprises a horizontal body member 1 having a shank 2 threaded internally for engagement with a pipe extending to the source of supply of liquid to be dispensed. The forward end of the faucet body is extended downwardly to form an outlet spout 3.

Centrally of the body of the faucet the walls are extended laterally to accommodate the valve operating means. There is a central passage 4 through the valve for the liquid which is to be dispensed. A partition wall 5 across said passage is provided with a horizontally disposed circular opening 6.

A valve 7 on the forward side of said opening is adapted to close the same when desired. Said valve has a head, the forward end of which is preferably provided with a washer 8 of compressible material. Said head is formed upon a valve stem 9 extending laterally through the walls of the faucet body. A threaded opening 10 through the outer wall of the faucet body is adapted to receive the threaded portion 11 of the valve stem. This threaded portion is preferably enlarged in diameter and threaded with a coarse thread of steep pitch whereby the valve may be readily moved by rotation of the stem. The outer end 12 of the valve stem is reduced in diameter and a cap 13 is threaded over the lateral extension 14 of the valve body, said cap fitting closely about the valve stem and having a stuffing box 15 to form a fluid-tight fit with the valve body. The outer end of the valve stem is formed to receive a handle 16, which is clamped rigidly thereon by means of a set screw and washer 17.

The handle which operates the valve stem comprises a yoke 18, one end 16 of which is fitted about the end of the valve stem and the other end 19 of which fits slidably upon a pin 20, the inner end of which is screwed at 21 into the side wall of the faucet body in opposite alignment with the valve stem 12. It will be noted, therefore, that the yoke 18 may be moved forwardly and backwardly on its axis formed by the valve stem 12 and the pin 20. The yoke, being rigid with the valve stem 12, is moved inwardly with the valve stem end and outwardly away from the valve body at the end 19, said end 19 sliding laterally upon the pin 20.

To agitate the liquid passing through the opening 6, I have formed an extension 22 upon the forward end of the valve. Said extension comprises a cylindrical member fitting closely within the opening 6 and secured to the head 7 of the valve by a threaded pin 25 formed on said extension and screwed within a recess in the forward end of the valve. The sides of the cylindrical extension are formed with inclined or spirally arranged grooves 23, shown in Figs. 1 and 3. The length of the extension is such that when the valve head 7 is moved into open position, the extension will be still closing the opening 6, except for the passages formed by the grooves 23. In Figs. 4, 5 and 6, I have shown a slightly different embodiment of the invention, in which the extension 22' is formed with a plurality of longitudinal openings 24 therein. At the inner end of the cylindrical extension and connecting with the openings 24 are grooves 26 formed in the inner face of the extension and directed spirally outwardly therefrom. In this embodiment the liquid passing through the channels 24 will be directed outwardly into the outlet passage through the spiral grooves thus formed. It will be noted that the two embodiments of the inventive idea are adapted to work on the same principle of constricting the passage through the valve opening and giving to the liquid passing therethrough a whirling motion so that a greater quantity of air may be included with the liquid.

By the use of this construction an agitation and foaming or creaming of the beverage may be accomplished in a most efficient manner at the time when the beverage is dispensed. The objects and advantages of this device will be apparent to those skilled in the art without further description.

What I claim as new and desire to protect by Letters Patent is:

1. In a dispensing faucet, a faucet body having a valve chamber therein, a valve seat in said chamber, a valve adapted to fit said seat, an agitating extension on said valve shaped to extend slidably through said seat, said extension having passages therein spirally arranged to impart a whirling motion to the liquid and means to move said valve to and from its seat.

2. In a dispensing faucet, a faucet body having a fluid conducting passage therethrough, a partition wall in said passage having a circular opening therein, a valve adapted to close said opening, a cylindrical extension on said valve fitting closely in said opening, said extension having passages therein formed to give a spiral movement to the liquid and means to move said valve to and from its seat.

3. In a dispensing faucet, a faucet body having a fluid conducting passage therethrough, a partition wall in said passage having a circular opening therein, a valve adapted to close said opening, a cylindrical extension on said valve fitting closely in said opening, said extension having passages therein formed to give a spiral movement to the liquid and means to move said valve to and from its seat, said extension being of such length that the opening of the valve will not withdraw said extension from said opening.

4. In a dispensing faucet, a faucet body having a central passage therethrough, a partition wall in said passage having a central opening therein, a valve adapted to close said opening, an extension on said valve fitting closely in said opening, there being spiral grooves longitudinally of said extension for the purpose described, and means to move said valve relative to said opening.

5. In a dispensing faucet a valve chamber, a partition wall in said chamber having a valve opening therein, a valve adapted to close said passage, and means on said valve fitting said opening to agitate the liquid passing through said opening for the purpose described.

In testimony whereof I hereunto affix my signature this 31st day of October A. D. 1925.

ISAAC A. STEIN.